United States Patent [19]

Cowan

[11] 3,835,751

[45] Sept. 17, 1974

[54] FLUID OPERATED SYSTEM

[75] Inventor: Larry Clyde Cowan, Jamestown, R.I.

[73] Assignee: Leesona Corporation, Warwick, R.I.

[22] Filed: July 5, 1973

[21] Appl. No.: 376,589

Related U.S. Application Data

[63] Continuation of Ser. No. 186,845, Oct. 6, 1971, abandoned.

[52] U.S. Cl. .................... 91/420, 91/443, 91/447
[51] Int. Cl. .................. F15b 11/08, F15b 13/042
[58] Field of Search ............. 91/420, 421, 447, 449, 91/450, 452, 463, 443

[56] References Cited

UNITED STATES PATENTS

| | | | |
|---|---|---|---|
| 2,177,828 | 10/1939 | Huck | 91/443 X |
| 3,595,264 | 7/1971 | Martin | 91/420 X |

FOREIGN PATENTS OR APPLICATIONS

| | | | |
|---|---|---|---|
| 507,811 | 11/1954 | Canada | 251/61.1 |
| 1,007,832 | 2/1952 | France | 91/42 D |
| 1,248,011 | 10/1960 | France | 91/443 |
| 1,036,801 | 8/1958 | Germany | 91/443 |

*Primary Examiner*—Irwin C. Cohen
*Attorney, Agent, or Firm*—Albert P. Davis; Burnett W. Norton

[57] ABSTRACT

A fluid operated system controls a reversible fluid operated apparatus and is herein described in the form of a speed control system for a reversible motor such as a double-acting cylinder housing a piston. The piston is selectively driven in either of opposite directions by a pressurized operating fluid introduced into one end of the cylinder while the opposite end of the cylinder is vented. Control devices in conduits opening into opposite ends of the cylinder regulate the piston speed. If desired only one of the conduits may be provided with a control device so that the piston moves at maximum speed in one direction and more slowly in the opposite direction.

Each control device includes a restriction to the flow of fluid through the associated conduit, and has a by-pass with a fluid piloted diaphragm valve about the restriction, the fluid pilot operatively communicating with the opposite conduit. When operating fluid passes through one of the conduits to operate the cylinder, the valve associated with the other conduit is piloted closed so that fluid vented from the cylinder passes through the restriction of the other conduit, thus retarding the venting rate of the fluid and slowing movement of the piston. If desired, one or both restrictions may be of a variable type.

4 Claims, 3 Drawing Figures

PATENTED SEP 17 1974 3,835,751

INVENTOR
LARRY C. COWAN
BY Albert P. Davis
Burnett W. Morton
ATTORNEYS

FLUID OPERATED SYSTEM

This is a continuation, of application Ser. No. 186,845, filed Oct. 6, 1971 and now abandoned.

This invention relates to a fluid operated system and a control device therein and, more particularly, to such a system and device for controlling operation of reversible apparatus.

Various speed control systems for fluid operated apparatuses are well known in the art and are often quite expensive, and may require substantial maintenance. Such systems may include restriction by-pass valves having relatively running parts subject to wear, such as a valve member which moves through a packing for regulating the flow of operating fluid to or from the apparatus. Alternately, check valves are frequently used in this environment but they generally have a relatively slow response time which permits some by-passing of the fluid before eating of the valve member. Often these known systems require interfaces for providing working fluid at adequate pressure to operate the apparatus. Also, many such systems and devices are prone to operational difficulties such as leaks and wear of the running parts, and often require precise adjustment.

It is an object of this invention to provide a new and useful control device. A related object is provision of such a device having a fluid flow path with a restriction, and a by-pass about the restriction with a fluid piloted diaphragm valve for regulating flow of fluid through the by-pass and about the restriction. Another related object is provision of such a device in which the by-pass communicates with a chamber on one side of the diaphragm, and pilot fluid is provided on the other side of the diaphragm.

Another object is provision of a new and useful fluid operated control system for fluid operated reversible apparatus. A related object is provision of such a system including a pair of paths for the flow of operating fluid to and from the apparatus to selectively operate the apparatus in reverse directions, a fluid flow restriction in at least one of the paths and a fluid piloted valve in parallel with the restriction, the fluid pilot being operated by fluid from the other of the paths.

The invention, in brief, is directed to a fluid operated control system for fluid operated apparatus, and to a control device forming part of the system. The apparatus to be controlled is connected through flow paths for selective passage of operating fluid to the apparatus and for venting operating fluid from the apparatus. One or both of the paths may contain a control device in the form of a fluid flow restriction in the path and a by-pass about the restriction. The by-pass includes a fluid piloted valve receiving pilot fluid from the other of the conduits to close the valve so that the vented fluid is slowed as it passes through the restriction, thus regulating the speed of operation of the apparatus.

These and other objects and advantages of the invention will be apparent from the description and the accompanying drawing, in which.

Figure 1:
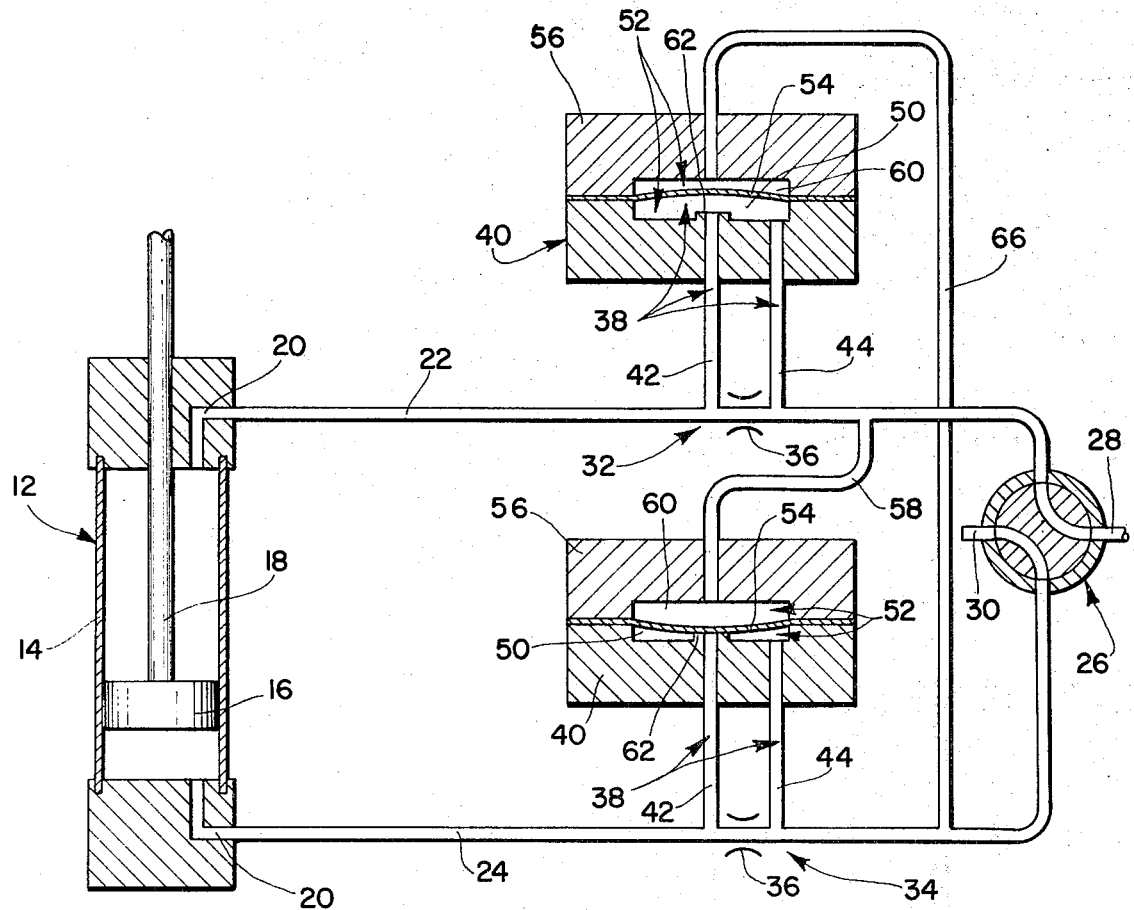
FIG. 1 is a sectional diagram of a preferred embodiment of a fluid operated control system.

Referring to FIG. 1 of the drawing, a fluid operated apparatus is illustrated in the form of a reversible motor 12 including a double-acting cylinder 14 with a piston 16 and piston rod 18 telescoped therein. The cylinder has a pair of passages 20, one opening into each of opposite ends of the cylinder 14, for connection with upper and lower conduits 22 and 24, respectively, defining flow paths between the cylinder and an operating valve 25. As shown in FIG. 1, the operating valve 26 is in a position for providing pressurized operating fluid, such as air at 80 psi gauge, for example, from a source of supply 28 and through the upper conduit 22 to the top of the cylinder 14, and for venting fluid from a lower end of the cylinder through the lower conduit 24 and a vent outlet 30 of the valve 26. A least one of the conduits 22 or 24, and as illustrated in FIG. 1, both of these conduits are provided with control devices 32 and 34, respectively.

Figure 2:
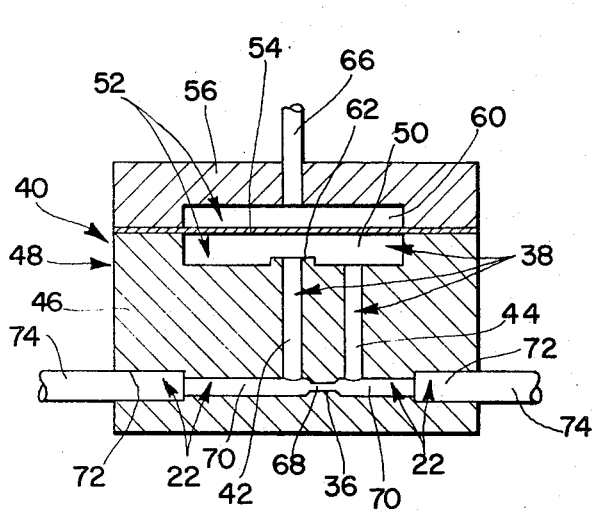
FIG. 2 is a sectional view of one of a pair of the control devices shown schematically in FIG. 1.

With reference to FIGS. 1 and 2, the control device 32 or 34 includes a fixed restriction 36 in a portion of the associated conduit 22 or 24 to provide a resistance to the flow of fluid therethrough. A by-pass 38 is provided about the restriction 36 and includes a control valve 40 for regulating the flow of fluid through the by-pass. The by-pass includes a pair of passages 42 and 44 in a main part 46 (FIG. 2) of a valve body 48, the passages communicating with the conduit 22 on opposite sides of the restriction 36 and opening into a lower portion 50 of a chamber 52 in the part 46 of the valve body 48. A flexible diaphragm 54 is clamped, in any suitable manner as by bolts (not shown), in sealing engagement between the part 46 and a cap 56 of the valve body 48. When the diaphragm 54 is in the position shown in the upper control device 32 (FIG. 1), operating fluid may pass throgh the by-pass 38 and about the restriction 36, thus providing substantially free flow of operating fluid from the source of supply 28 into the upper portion of the cylinder 14, to move the piston 16 downwardly.

When operating fluid passes from the source of supply 28 through the operating valve 26 and the upper conduit 22 (FIG. 1), pilot fluid is provided from the upper conduit to the lower control device 34 through a passage provided by a pilot conduit 58 and into a pilot portion 60 of the chamber 52 of the lower control device 34, and moves the diaphragm 54 into sealing engagement with a valve seat 62 formed about the opening of the by-pass passage 42 into the lower portion 50 of the chamber 52, thus closing this passage and preventing passage through the lower by-pass 38 of fluid vented from the lower end of the cylinder 14. Therefore, the vented fluid passes through the restriction 36 in the lower conduit 24, thus slowing the movement of the vented fluid. Thus, movement of the piston 16 downwardly in the cylinder 14 is regulated by the size of the fixed restriction 36 in the lower conduit 24.

When the operating valve 26 is reversed to provide operating fluid to the cylinder 14 through the lower conduit 24, and to vent the upper portion of the cylinder 14 through the upper conduit 22, the pilot portion 60 of the lower control device 34, is also vented through the pilot conduit 58 into the conduit 22 and the lower diaphragm 54 is released from seated engagement with the valve seat 62 so that the operating fluid passes freely through the by-pass 38 of the lower control device and to the lower portion of the cylinder 14. Operating fluid from the lower conduit 24 also passes through a pilot conduit 66 to the pilot portion 60 of the chamber 52 in the upper control device 32, causing its diaphragm 54 to move into sealing engagement with its valve seat 62, thus closing the by-pass 38 and slowing movement of the piston 16 upwardly in the cylinder 14 because of the restriction 36 in the upper conduit 22.

As shown in FIG. 2, the restriction 36 is formed by a relatively small passage 68 in the body part 46 of the valve 40. Larger passages 70 open into opposite ends of small passage 68. At the outer extremities of the larger passages 70 the body is formed with passages 72 of sufficient diameter to receive suitable tubes 74, for example as illustrated, with a sealing press fit. Together the passages 68 and 70 and tubes 74 form the conduit 22. The by-pass passages 42 and 44 open into the larger passages 70 on either side of the small passage 68.

Figure 3:
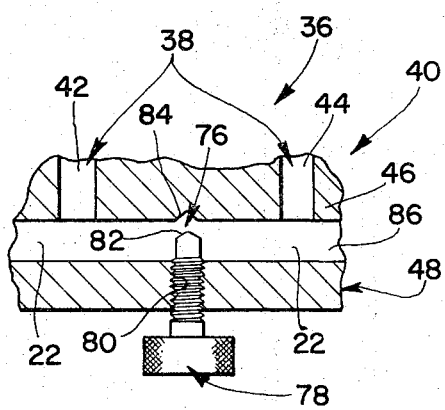
FIG. 3 is an enlarged, fragmentary sectional view of a modified portion of FIG. 2.

FIG. 3 shows a modification of the restriction 36 shown in FIGS. 1 and 2. In FIG. 3 a variable restriction 76 is provided. The variable restriction is in the form of a needle valve 78 adjustably threadedly seated in a bore 80 extending through the lower face of the main part 46 of the control valve 40 and has a needle valve face 82 cooperating with a suitable seat 84 formed in a wall of a passage 86 in lieu of the passages 68 and 70 of the conduit 22 shown in FIG. 2. By threading the needle valve 78 toward or away from the seat 84 the rate of flow of vented fluid from the cylinder 14 may be regulated, to regulate the speed of the piston 16.

While this invention has been described with reference to particular embodiments in a particular environment, various changes may be apparent to one skilled in the art and the invention is therefore not to be limited to such embodiments or environment except as set forth in the appended claims.

What is claimed is:

1. A fluid operated control system for operating fluid operated piston means through a power stroke comprising, means defining a pair of paths for passage of fluid to and from said piston means, control means connected with said paths for selectively providing operating fluid to one of said paths at a predetermined rate of flow for actuating said power stroke and for venting the other of said paths to permit exhaust of said piston means, fluid flow restriction means in said other path, said fluid flow restriction means being operable to afford uninterrupted venting passage of fluid in said other path at a rate of flow less than said predetermined rate, a bypass valve in parallel with said restriction means, said valve having open and closed positions respectively permitting in open position said predetermined rate of flow and in said closed position said rate of flow less than said predetermined rate, a fluid pilot connected with said valve, and means for providing pilot fluid from said one path to said fluid pilot coincidently with providing the operating fluid to said one path throughout the entire power stroke to thereby move said valve to said closed position thereby venting the other of said paths to permit completion of said power stroke said valve has a diaphragm operable in unflexed position to permit the flow of fluid through the valve, and said fluid pilot flexes the diaphragm to seat on and close said path.

2. A system as set forth in claim 1 wherein said one path includes further fluid flow restriction means, said fluid flow restriction means being operable to afford continuous passage of fluid in said one path at a rate of flow less than said predetermined rate, a further fluid piloted valve in parallel with the last said restriction means, and means for providing pilot fluid from said other path for operating said further valve.

3. A system as set forth in claim 2 wherein said valve and said further valve each has a diaphragm operable in unflexed position to permit the flow of fluid through the associated valve, and said fluid pilot associated with each said valve flexes the respective diaphragm to seat on and close said path.

4. A system as set forth in claim 1 wherein said piston means includes a piston slidable within a chamber, said one path is connected at a first end of said chamber and said other path is connected at a second end of said chamber remote from said first end, operating fluid provided through said first path acting to bias said piston toward the second end of said chamber, said piston when moved toward said second end acting to force fluid within said chamber through said other path.

* * * * *